(12) United States Patent
Nguyen et al.

(10) Patent No.: US 8,818,028 B2
(45) Date of Patent: Aug. 26, 2014

(54) SYSTEMS AND METHODS FOR ACCURATE USER FOREGROUND VIDEO EXTRACTION

(75) Inventors: Quang H. Nguyen, Ho Chi Minh (VN); Greg Meyer, Champaign, IL (US); Minh N. Do, Urbana, IL (US); Dennis Lin, Urbana, IL (US); Sanjay J. Patel, Urbana, IL (US)

(73) Assignee: Personify, Inc., Chicago, IL (US)

( * ) Notice: Subject to any disclaimer, the term of this patent is extended or adjusted under 35 U.S.C. 154(b) by 761 days.

(21) Appl. No.: 13/083,470

(22) Filed: Apr. 8, 2011

(65) Prior Publication Data

US 2011/0249190 A1 Oct. 13, 2011

Related U.S. Application Data

(60) Provisional application No. 61/322,624, filed on Apr. 9, 2010, provisional application No. 61/322,629, filed on Apr. 9, 2010.

(51) Int. Cl.
*G06K 9/00* (2006.01)
*H04N 5/272* (2006.01)

(52) U.S. Cl.
CPC .................................. *H04N 5/272* (2013.01)
USPC .......................................... 382/103; 382/106

(58) Field of Classification Search
USPC ....................... 348/169, 208.14; 382/103, 106
See application file for complete search history.

(56) References Cited

U.S. PATENT DOCUMENTS

| | | | |
|---|---|---|---|
| 5,001,558 A | 3/1991 | Burley et al. | |
| 5,343,311 A | 8/1994 | Morag et al. | |
| 5,506,946 A | 4/1996 | Bar et al. | |
| 5,517,334 A | 5/1996 | Morag et al. | |
| 6,150,930 A | 11/2000 | Cooper | |
| 6,664,973 B1 | 12/2003 | Iwamoto et al. | |
| 7,773,136 B2 | 8/2010 | Ohyama et al. | |
| 8,175,384 B1* | 5/2012 | Wang | 382/173 |
| 8,649,932 B2 | 2/2014 | Mian et al. | |
| 2002/0158873 A1 | 10/2002 | Williamson | |
| 2005/0094879 A1 | 5/2005 | Harville | |
| 2007/0110298 A1 | 5/2007 | Graepel et al. | |
| 2007/0146512 A1 | 6/2007 | Suzuki et al. | |
| 2007/0201738 A1 | 8/2007 | Toda et al. | |
| 2009/0244309 A1 | 10/2009 | Maison | |
| 2010/0195898 A1 | 8/2010 | Bang et al. | |
| 2010/0302395 A1* | 12/2010 | Mathe et al. | 348/222.1 |
| 2011/0193939 A1 | 8/2011 | Vassigh | |
| 2011/0242277 A1* | 10/2011 | Do et al. | 348/43 |
| 2011/0243430 A1 | 10/2011 | Hung et al. | |
| 2011/0293179 A1* | 12/2011 | Dikmen et al. | 382/167 |

OTHER PUBLICATIONS

U.S. Appl. No. 13/076,264, filed Mar. 30, 2011, Minh N. Do et al.
U.S. Appl. No. 12/871,428, filed Aug. 30, 2010, Quang H. Nguyen et al.

* cited by examiner

*Primary Examiner* — Gregory F Cunningham
(74) *Attorney, Agent, or Firm* — Invention Mine LLC

(57) ABSTRACT

A color image and a depth image of a live video are received. Each of the color image and the depth image are processed to identify a foreground, background, and an unknown region band of the live video. The unknown region band may comprise pixels between the foreground and the background. Further processing is performed to segment the pixels of the unknown region band between the foreground and the background. As such, processing is performed on the unknown region band in order to provide an improved user foreground video.

23 Claims, 12 Drawing Sheets

SYSTEMS AND METHODS FOR ACCURATE USER FOREGROUND VIDEO EXTRACTION

RELATED APPLICATION

This application claims the benefit of U.S. Provisional Application No. 61/322,624 filed on Apr. 9, 2010 and entitled "Accurate Human Extraction using Infrared-based Depth Cameras" and U.S. Provisional Application No. 61/322,629 filed on Apr. 9, 2010 and entitled "Extracting Foreground Video using Depth Camera and Graph Cuts."

BACKGROUND OF THE INVENTION

1. Field of the Invention

The present invention is related to the field of video processing, and more specifically towards systems and methods for accurate user foreground video extraction.

2. Art Background

Background subtraction comprises the removal of a background from a live video, the results of which results in a video comprising the foreground of the live video. Conventional video processing techniques use such background subtraction processes for video conference applications. For example, the foreground of the live video may be extracted and then inserted or embedded into a second background.

Although conventional video processing techniques insert or embed a foreground from a live video into a second background, the conventional techniques do not provide an accurate or clear foreground video. For example, pixels comprising a user's hair or portions of the user's fingers may be not be accurately represented by a depth camera and as such provide a poor representation of a user. As such, the extracted foreground video may appear to be of poor quality.

Accordingly, it is highly desirable to develop systems and methods for accurate user foreground video extraction. The systems and methods may provide increased user foreground accuracy through processing of a depth image and a color image.

SUMMARY OF THE INVENTION

The systems and methods disclosed herein provide accurate user foreground video extraction. Specifically, the systems and methods may receive a depth image and a color image of a frame from a live video from at least one camera. The depth image is processed by identifying a categorization for each of its pixels. The categorization may be based on a comparison of depth values for each of the pixels and a pixel history such that pixels may be categorized as one of a foreground pixel, background pixel, unclear pixel, or an unknown pixel. A region map is then created based on the categorization of the pixels. Next, an unclear region of the color image is identified based on at least the region map. An unclear region band of the color image is then created. The unclear region band may at least comprise unclear pixels. The unclear pixels in the unclear region band are then segmented or distributed between the foreground and background of the color image.

BRIEF DESCRIPTION OF THE DRAWINGS

The novel features of the invention are set forth in the appended claims. However, for purpose of explanation; several embodiments of the invention are set forth in the following figures.

DETAILED DESCRIPTION

The systems, methods, and circuits disclosed herein relate to accurate user foreground video extraction.

In the following detailed description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in, the art. In other instances, well known methods, procedures, and systems have not been described in detail to avoid unnecessarily obscuring aspects of the present invention.

Figure 1:
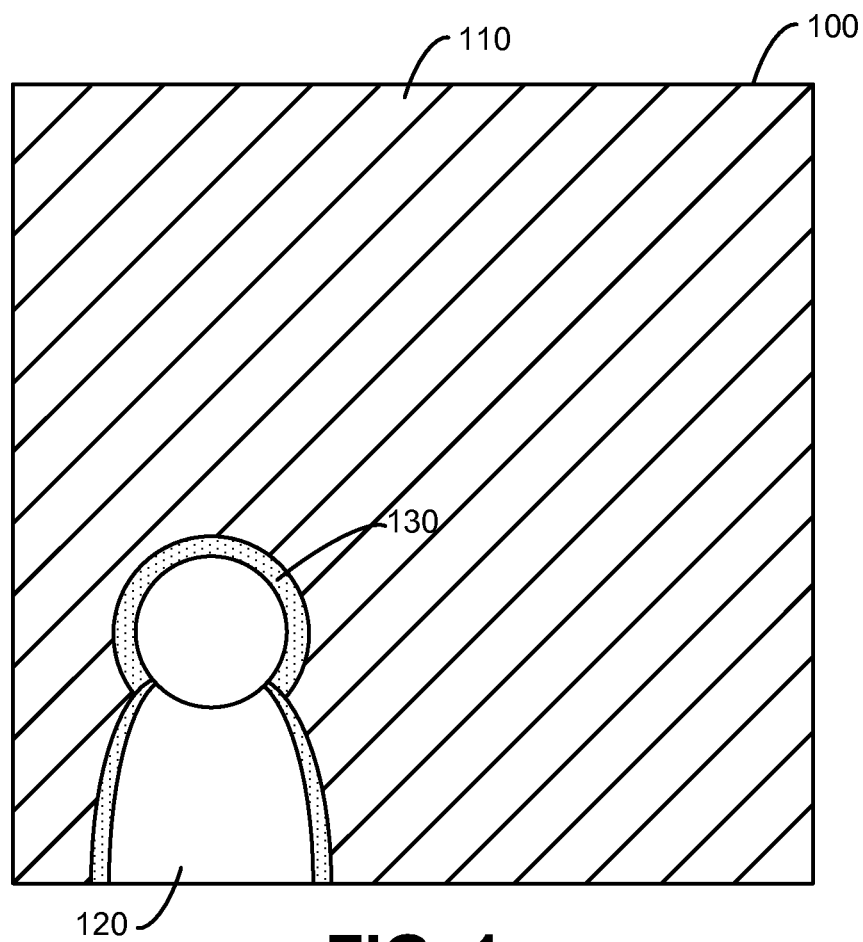
FIG. 1 illustrates an example video comprising a foreground portion, background portion and an unclear portion in accordance with some embodiments.

FIG. 1 illustrates an example video 100. In general, the example video 100 comprises a background portion 110, an unclear portion 130, and a foreground portion 120. For example, the background portion 110 may comprise a wall, outdoor scene, or any other background scene and the foreground portion 120 may comprise a human user or presenter. However, the foreground portion 120 may comprise any identifiable object or entity. The unclear portion 130 may comprise the boundary between the background portion 110 and the foreground portion 120. In some embodiments, the unclear portion 130 may comprise an area of pixels that have not been identified with certainty of belonging to the background portion 110 or the foreground portion 120. As such, the example video 100 may be divided into at least three portions—a background 110, a foreground 120, and the unclear portion 130. For example, if the video 100 comprises a user speaking in a room, then the user may comprise the foreground portion 120, a wall of the room may comprise the background portion 110, and the unclear portion 130 may comprise a boundary around the user and the wall.

Figure 2:
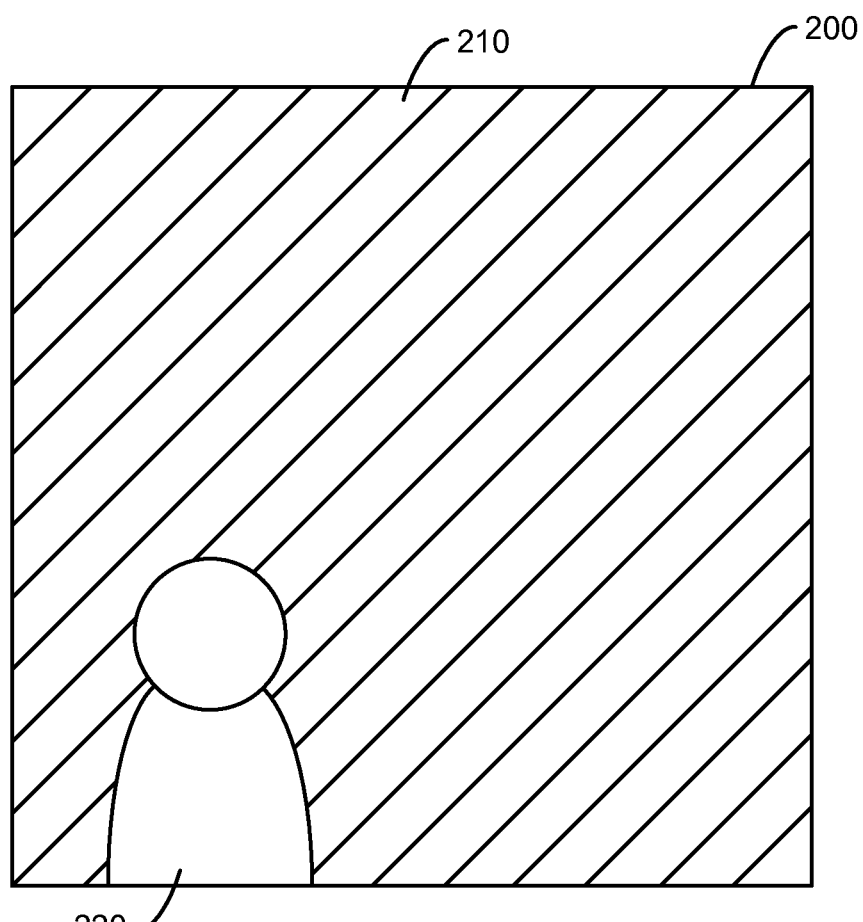
FIG. 2 illustrates an example video with the background portion subtracted or removed and the unclear portion segmented between the foreground and the background.

FIG. 2 illustrates an example processed video 200. In general, the processed video 200 comprises a foreground portion 220 and a background portion 210. However, any unclear portions of the video have been categorized as either foreground or background after processing of depth and color images of the video. As such, the processed video 200 approximates the video 100 with the segmentation or categorization of pixels within the unclear portion as foreground pixels or background pixels. In some embodiments, the segmenting of the unclear pixels of the unclear portion may comprise distributing the unclear pixels between the foreground region and the background region. For example, an erosion or dilation of the image may occur such that the boundaries of the background region and foreground region change. In some embodiments, after segmenting or categorizing the pixels within the unclear portion, the background portion 210 may be subtracted or removed in order to create a foreground video.

Figure 3:
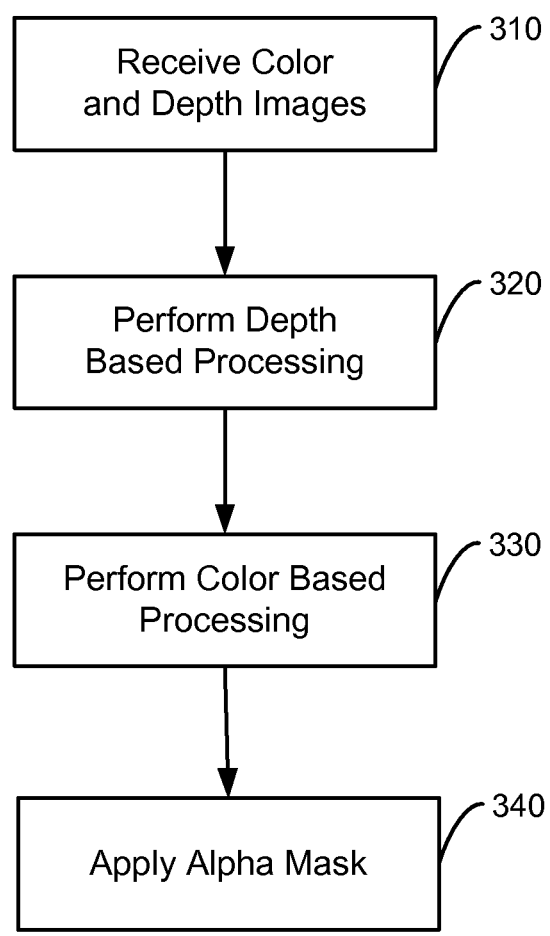
FIG. 3 is a flow diagram illustrating an example embodiment of a method for accurate user foreground video extraction.

FIG. 3 illustrates an example method 300 for accurate user foreground video extraction. In some embodiments, the identified background portion may be removed to create a foreground video. In general, the method 300 processes a depth image and a color image to extract a user foreground video.

As seen in FIG. 3, at block 310, a color image and a depth image is received. The depth image may comprise information indicating the distance of each pixel of an image frame of a video from a sensor. The color image may comprise color pixel information of an image frame of a video. The depth and color camera information may be received from a three dimensional (3D) camera, depth camera, z-camera, range camera, or from a plurality of sources. For example, the color information may be received from a color camera and the depth information may be received from a depth camera. In some embodiments, the color information and depth information may be received from a single camera. For example, the color information may be received from a red-blue-green (RGB) sensor on a camera and the depth information may be received from an infrared (IR) sensor comprised within the same camera. Further details with regard to the camera are described with relation to FIG. 11. As such, the method 300 receives depth and color information of a video. At block 320, the depth image is processed as further discussed with relation to FIGS. 4, 5, and 6. At block 330, the color image is processed as discussed in more detail with relation to FIGS. 7, 8, 9A, and 9B. Finally, at block 340, an alpha mask may be applied to the resulting image.

Figure 4:
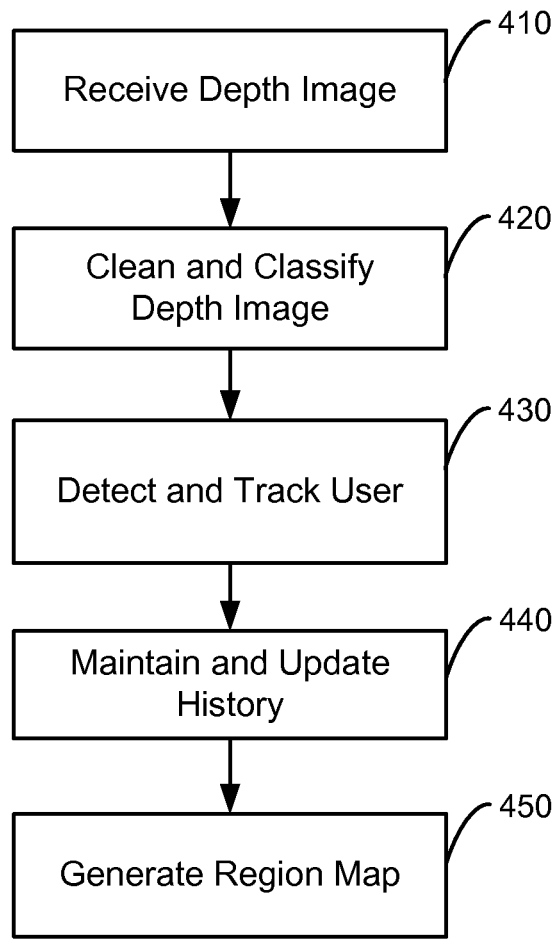
FIG. 4 illustrates a high level abstraction of an example method for the depth based processing of a depth image for identifying sections of the depth image.

FIG. 4 illustrates a high level method 400 for the depth based processing of a depth image for identifying sections of the depth image. In general, the method 400 receives a depth image, classifies portions of the depth image, and generates a region map from the depth image.

As seen in FIG. 4, at block 410, a depth image is received. As previously mentioned, the depth image may comprise a depth value for each pixel that indicates the distance of each pixel of an image frame from a sensor. At block 420, the depth image is cleaned and classified or categorized. For example, pixels may be categorized as a user pixel, background pixel, or unknown pixel based on the depth value of the pixel and a user history and/or a background history. As such, in some embodiments, a section map may be created. The section may comprise multiple user categorizations or sections, as described in further detail below. Details with regard to the user histories and background history are discussed in further detail below. In some embodiments, the pixels are grouped into connected components, as discussed in further detail below. At block 430, connected components are tracked. In some embodiments, if a component comprises unknown pixels, a head must be detected for the component to be a user. However, if the component comprises background pixels (e.g., the component was not detected as a user in a previous frame and it is now part of the background), then the component must have a head and be in motion. As such, in some embodiments, a plurality of users may be detected. For example, two separate connected components may be detected to move and as such be detected as two separate users. In some embodiments, the two separate connected components may be at least a predefined distance from each other. Further user information is detected and/or tracked, as mentioned in further detail below with relation to FIG. 5. At block 440, any or all of the user histories and background history are updated. In some embodiments, the user histories and background history comprise an average value (e.g., depth value) of each pixel from a plurality of frames. For example, the histories may comprise an average depth value of each pixel from a plurality of previously processed depth image frames. At block 450, a region map may be created. In some embodiments, a region map may comprise a categorization or classification of each pixel of the depth image. For example, the region map may specify or categorize which pixel is a background pixel, foreground pixel, unclear pixel, or an unknown pixel. In some embodiments, the creation of the region map is based upon the previous classification of the depth image and user information. For example, the user information may comprise that a first user should be enabled and a second user should be disabled. In response to the user information, the region map may comprise the previous categorization of the depth image, but with the disabled user's pixels or connected component being categorized as a background and the enabled user's pixels or connected components remaining categorized as a foreground. Details with regard to the method 400 are discussed in further detail below with regard to FIG. 5.

Figure 5:
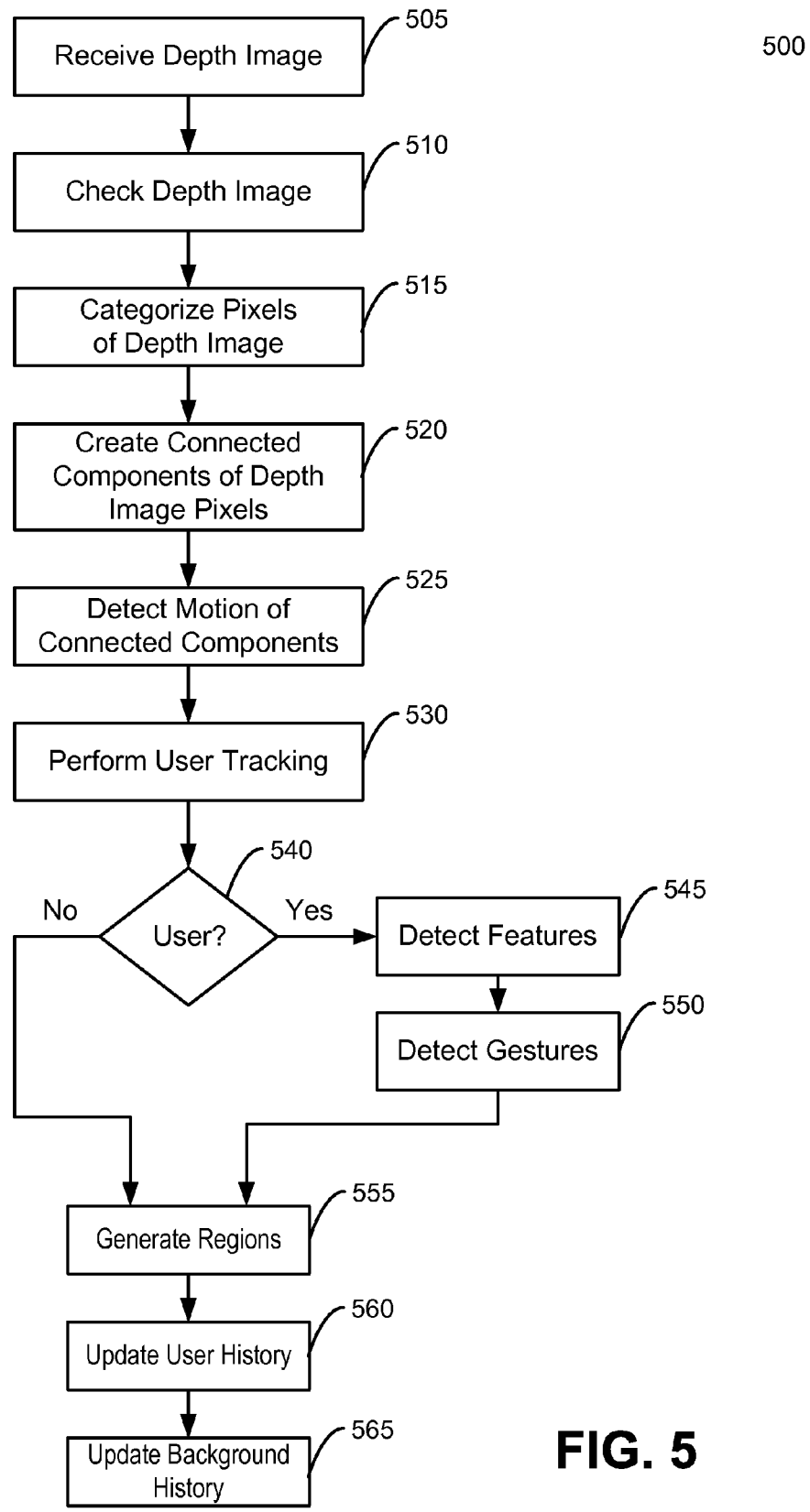
FIG. 5 is a flow diagram illustrating an example embodiment of a method for depth based processing for identifying a foreground portion and a background portion of a video.

FIG. 5 illustrates a method 500 for depth based processing for the identifying of a foreground portion and a background portion of a video. In some embodiments, the identified background portion may be removed to create a foreground video. In general, the method 500 receives depth image information and categorizes image pixels based on the depth image information.

As seen in FIG. 5, at block 505, a depth image is received. At block 510, the depth image is checked. In some embodiments, upon receiving a new depth image frame from a camera, the depth image frame is checked to determine whether the depth information is useful. For example, if the majority of pixels from the depth image comprise small or invalid values then the depth image frame may be considered to not be useful and as such may be discarded. In some embodiments, if a depth image frame is discarded then all pixels in the region map (described in more detail below) are set to 'unknown.' Moreover, in some embodiments, if a large number of consecutive depth image frames (e.g.; 20 consecutive frames) comprise invalid depth information, then all depth histories (described in further detail below) and user information may be cleared or deleted.

At block 515, individual pixels of the depth image frame are categorized. Each pixel may be categorized or determined to belong to a section of the depth image frame. For example, each pixel may be categorized as unknown, background, a user pixel, or as a bad pixel. In some embodiments, there may be a plurality of types of user pixels. For example, each user may comprise a separate user pixel identification in order to keep different users separate. In some embodiments, the categorization of the pixels is based on a background history and user histories. Each of the background history and each user history comprises an aggregate history of the background pixels and user pixels as compiled from previous depth image frames. For each pixel of a received depth image frame, the current depth value is compared to the depth value in the background and foreground histories and ideally matched as either background or a user. In some embodiments, how close a pixel's current depth value must match either of the background or user histories may be based upon a confidence level threshold of the pixel. For example, to determine the best match (e.g., whether the pixel is a user or background) may comprise a cost calculated for each history and the history with the lowest cost may be chosen to be the pixel's section or categorization. If the depth value of a current pixel does not match any of the background or user histories, then the pixel may be labeled as unknown. In some embodiments, if the pixel has an invalid depth value or a depth value beyond a threshold, then the pixel may be labeled as an invalid pixel (e.g., a bad pixel).

As seen in FIG. 5, at block 520, connected components of the depth image pixels are created. In some embodiments, the creation of connected components may group pixels into components based on the pixel's section or categorization and the pixel's depth value. For example, each pixel's depth value and categorization (i.e., user, unknown, or background) may be compared with its neighboring pixels' depth value and categorization. In some embodiments, the categorization may comprise a different categorization for each user. As such, a plurality of user categorizations may be used. If neighboring pixels share a common categorization and have similar depth values, then the neighboring pixels may be considered to be a part of a single component. However, for pixels that are categorized as having an invalid depth, the pixel's depth value is not compared with a neighboring pixel's depth value. As such, neighboring pixels with an invalid depth categorization will be grouped into a single component. In some embodiments, in order to reduce computational resources, disjoint sets are used to manage the connected components. Once the connected components are determined (e.g., components are created for foreground components, background components, etc.) each component comprising the pixels categorized as unknown are examined. A determination may be made to decide whether the unknown component is connected to a known component such as a background or foreground component. For example, for each unknown component, a list of connections to known categorized components is generated. If the unknown component is connected to one or more known categorized components, then the categorized component selected for the unknown component is based on the total number of connections and the total depth difference between the unknown component and the categorized component. For example, if an unknown component comprises a large number of connections to a background component and there is a small depth difference between the unknown component and the background component, then the unknown component may be categorized as a background component. As such, all pixels in the unknown component may be categorized as a background component and included in the background component. Thus, the previously unknown pixels are regrouped into the background component pixels.

At block 525 of FIG. 5, a motion detection of connected components is performed. The motion detection determines if a component is moving between depth image frames. A moving component may be determined to be a person (e.g., a user). As such, a user may be detected at block 525. In some embodiments, a camera may provide an infrared intensity image and as such the difference between the infrared intensity or depth value of the current image frame and a previous image frame may be calculated. If a pixel's infrared intensity increases by a significant amount and the pixel's value is below a specific threshold, then the pixel may be marked as moving. In embodiments where the camera does not provide an infrared intensity image, a pixel may be considered to be moving if its depth value decreases by a specific amount and the pixel depth value is below a specific threshold. Each component comprising a moving pixel may be further examined. If the number of moving pixels in a single component is above a predefined minimum amount and the percentage of moving pixels is not small relative to all pixels of the component, then the component may be tagged as being in motion and as such may comprise a user.

As seen in FIG. 5, at block 530, user tracking is performed on the connected components. In some embodiments, user tracking may be performed at every few frames and result in the analysis of all of the connected components. In some embodiments, a connected component in motion must have a user head detected in order for the connected component to be categorized as a user. For example, for an unknown component, the user tracking may comprise checking the unknown component to determine whether the unknown component should be a foreground component or if it is a part of an existing foreground component (e.g., the unknown component is a user). If the unknown component is not part of an existing user, then the unknown component may be a new user and thus is analyzed through additional processes at blocks 545 and 550. Similar processes are performed for a background component. However, for a background component to be re-categorized as a foreground or user component, the background component must be approximate to a user's center of mass. Moreover, in some embodiments, a new user must have additional features detected and must be in motion. If a background component is determined to be a part of a user or a new user, then the component is removed from the background history.

The performance of the user tracking at block 530 may further comprise processing checks on foreground or user components. For example, if a foreground or user component is far from a user's center of mass, then it may be re-categorized as an unknown component. If a user component is close to another user's center of mass, then it may be removed from the current user and into the second user's history. In some embodiments, following the previously described processing steps, the user's information may be updated based on the current frame. For example, information related to a user's center of mass, dimensions, and motion may be updated. As such, the positioning and placement of a user may be detected such that a user's gestures may be detected, as described in further detail below. In some embodiments, a detected gesture from a user may enable or disable the user from the system or the user's standing placement (e.g., depth threshold) may be used to enable or disable the user. As such, a history of various characteristics of a user are recorded and updated.

If it is determined that a component is a user at block 540, then at block 545, the user's features are detected. In some embodiments, the features detected may comprise a user's head and hands. To do so, the user's torso and neck may first be located by segmenting the user component into a plurality of horizontal slices and moving upward until the width of the horizontal slices begins to diverge from the average width by a set amount. After finding the user's torso and neck, the user's head is identified by examining an area above the identified neck. Once the user's head is found, then the user's hands may be identified by performing a skeletonization of the user component. In some embodiments, the user's hands may be assumed to be the furthest points to the left and the right of the user's torso.

As seen in FIG. 5, at block 550, a user component's gestures are detected. As such, at block 550, a user raising his or her hand may be detected. In some embodiments, the detection of a user's gestures is based on the previously provided position of the user's features. In some embodiments, a user raising his or her hand may be detected by a vertical line comprising the user's hand position as well as a distance.

At block 555, a region map may be created. In some embodiments, the region map may be created based on the previously discussed categorizations and user information. The region map may comprise values of foreground, background, unclear, and unknown. For a background component, the region is set to background. In some embodiments, an invalid depth component may be set to unknown. If the component is set to unknown, then it may be checked to see whether it is close in proximity to a user such that it may be considered to be part of the user and as such categorized as an unclear component. If the user is enabled then the user component may remain as a foreground component, but if the user is disabled, then the user component may be re-categorized as a background component. As such, in some embodiments, the region map may comprise a categorization of pixels and/or components as foreground, background, unclear, or unknown.

At block 560 in FIG. 5, user histories may be updated. In some embodiments, a user history is recorded and updated for each user. Each pixel in the user history may comprise a depth value and a confidence level. In some embodiments, the user history is updated for each received depth frame. The depth values may be updated using an exponential moving average. The confidence level may be updated so as to increase whenever a pixel is categorized as a user and the depth value is similar to the depth value in the user history. However, if the depth value is significantly different, then the confidence level may decrease. If a pixel is labeled as a background then the confidence level decreases, but if a pixel is labeled as another user, then the user confidence may decrease more slowly. As such, the user histories enables the systems and methods disclosed herein to determine which pixels are associated to which user in a following frame.

At block 565, a background history may be updated similar to the user history as previously described. In some embodiments, the background history may comprise two different types of histories such as a trusted and non-trusted history. The non-trusted history may be updated per each frame. When a pixel is labeled as a background and the depth value matches the depth value in the non-trusted history then the age of the pixel increases. If the age of the pixel reaches a defined minimum age, then the pixel is re-categorized as trusted. If the depth value continues to match the depth value in the trusted history, then the confidence level may increase. However, if the depth value does not match, then the confidence level will decrease and if the confidence level reaches zero then the history at the pixel may be re-categorized as non-trusted.

Figure 6:
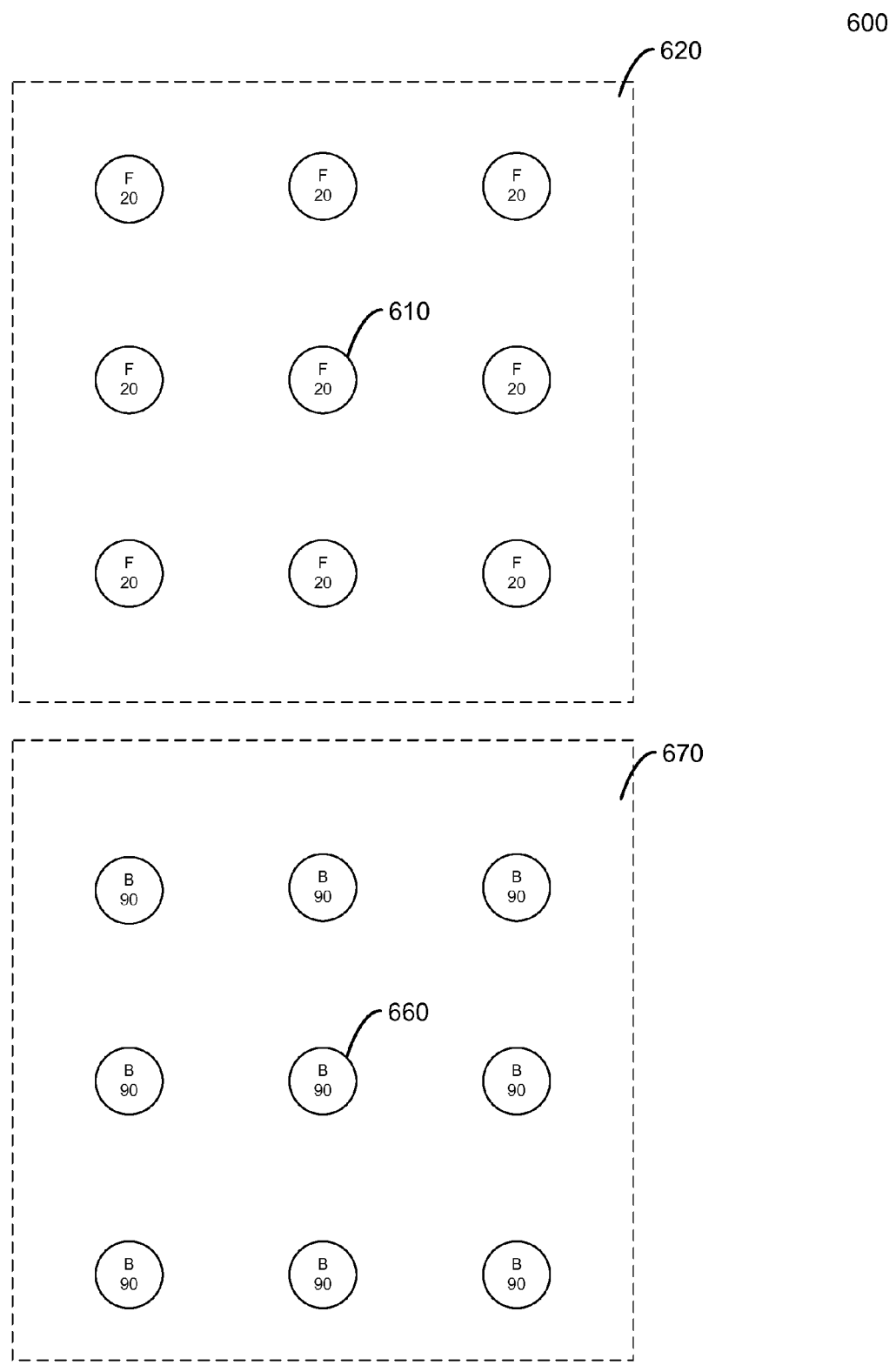
FIG. 6 is an example of grouping pixels of a depth image into connected components in accordance with some embodiments.

FIG. 6 is an example of grouping of pixels 600 of a video into connected components. In general, pixels of a similar categorization (i.e., foreground and background) and a similar depth value are grouped into a connected component.

As seen in FIG. 6, the grouping of pixels 600 comprises foreground pixels 610 and background pixels 660. Each of the foreground pixels comprises a foreground categorization and a similar depth value. For example, each pixel is categorized as a foreground pixel with a depth value of 20. Furthermore, the grouping of pixels 600 comprises background pixels 660. Similarly, each of the background pixels comprises a background categorization and a similar depth value of 90. Although specific depth values of 20 and 90 are described, one skilled in the art would appreciate that any depth value may be used in the grouping of pixels into connected components. Moreover, in some embodiments, pixels of varying depth value may be grouped together into a single connected component. In some embodiments, pixels with a depth value within a depth value range may be used when grouping pixels into connected components. For example, pixels with depth values of 25 and 29 may be considered to have a similar depth value while pixels within depth values of 78 and 83 may be considered to have a similar depth value. As such, in some embodiments, a depth value range may be used when grouping pixels into connected components. The grouping of pixels 600 comprises connected component 620 and connected component 670. Foreground pixels 610 with a similar depth value have been grouped together into connected component 620 and background pixels 660 with a similar depth value have been grouped together into connected component 670. As such, in some embodiments, neighboring or connected pixels with an identical categorization and a similar depth value have been grouped into connected components.

Figure 7:
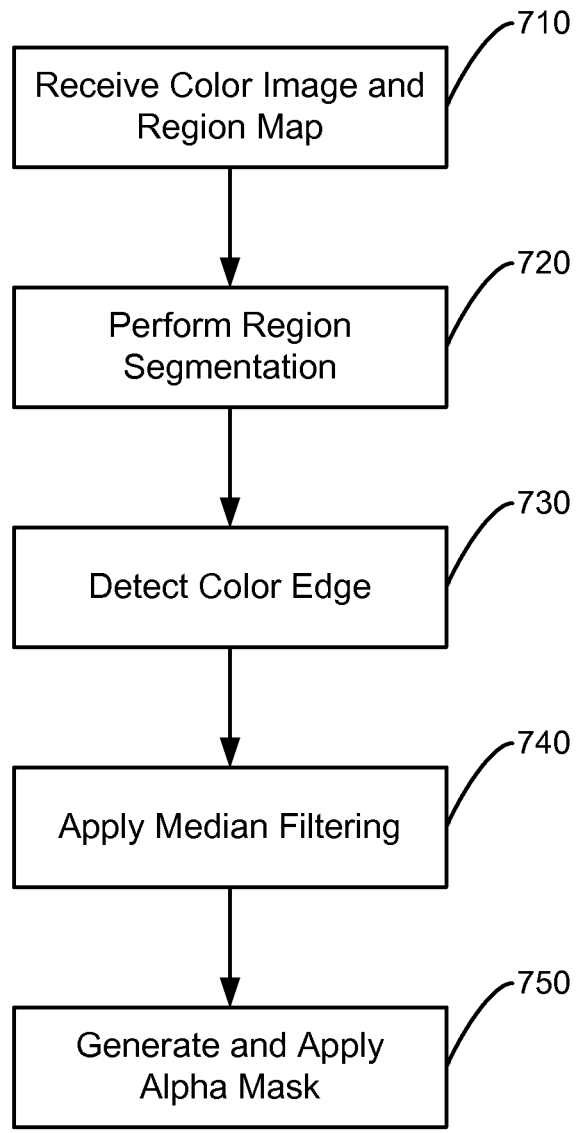
FIG. 7 is a high level abstraction of an example method for color image based processing to identify a foreground portion and a background portion of a video and segmenting an unclear region to extract and accurately define a user foreground video.

FIG. 7 illustrates a high level flow diagram of a method 700 for color image based processing to identify a foreground portion and a background portion during to extract and accurately define a user foreground video. In general, the method 700 receives a color image and a region map of a corresponding depth image as previously discussed, segments the foreground and background from the color image to create an unclear region or band of pixels, and processes the unclear region or band of pixels.

As seen in FIG. 7, at block 710, a color image and a region map are received. At block 720, region segmentation may be performed and, at block 730, the color image edges may be detected. In some embodiments, the unknown region 130 of FIG. 1 may be detected and then segmented between the background and the foreground. For example, an unclear band may be created around the unclear region 130. In some embodiments, the unclear band may be expanded to comprise the unclear region, band, and/or pixels as well as neighboring foreground and background pixels. In some embodiments, the color image pixels in the band may then be segmented between the foreground and the background such that at least two subsets of pixels are created. In some embodiments, one subset may comprise a portion of the unclear pixels within the unclear band with the foreground and a second subset that may comprise a separate portion of the unclear pixels within the unclear band with the background. As such, in some embodiments, color image processing is performed on the band comprising the unclear region. Thus, since additional color image processing is performed on the unclear region band, processing resources and time are conserved since the entire image is not being processed.

Figure 8:
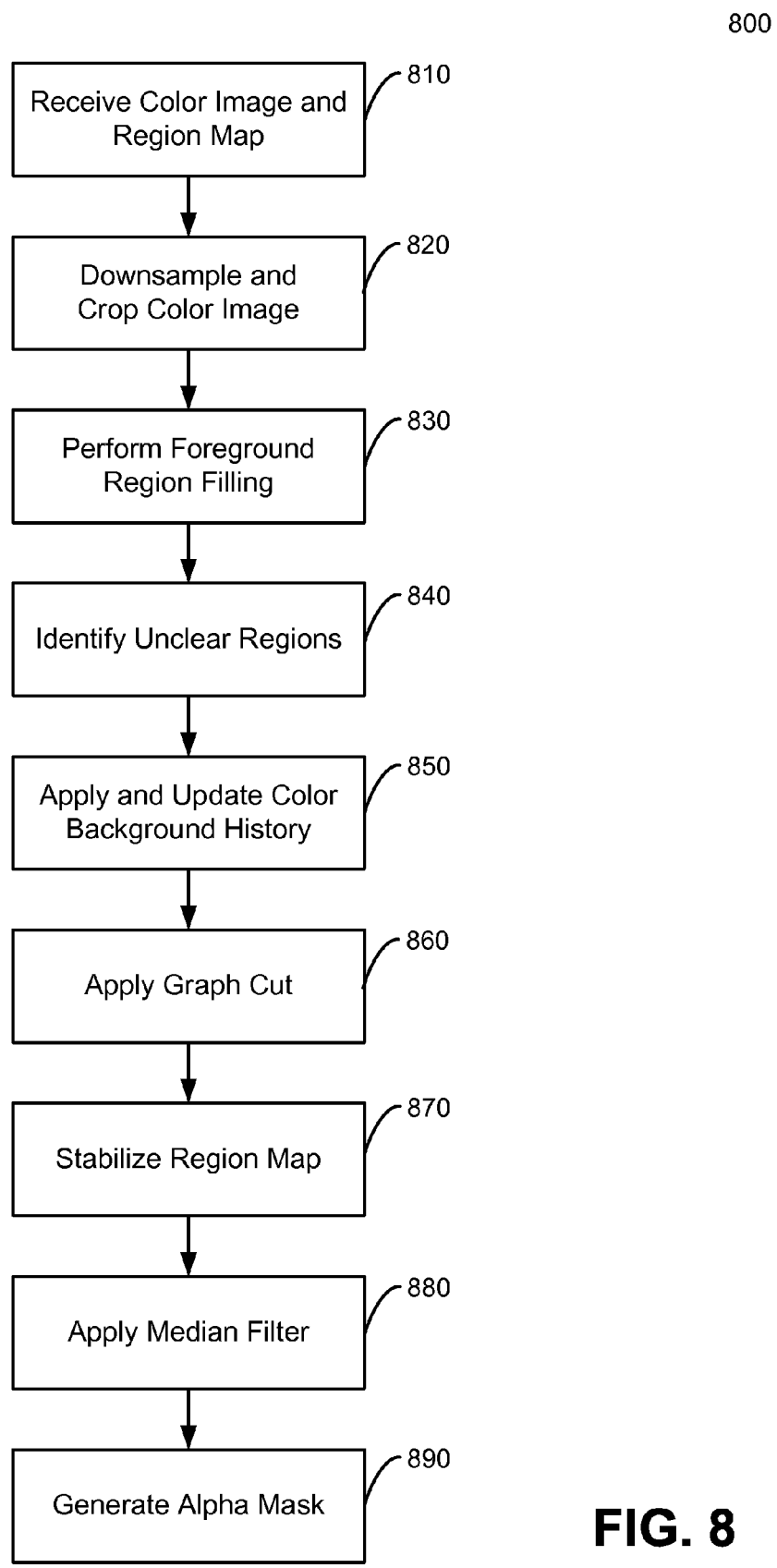
FIG. 8 is a flow diagram of a method for color based processing for the identification of a foreground portion and a background portion to extract a user foreground video.

FIG. 8 illustrates a flow diagram of a method 800 for color based processing for the identification of a foreground portion and a background portion to extract a user foreground video. At block 810, a color image is received. In some embodiments, a region map as previously discussed with regard to FIG. 5 may also be received. At block 820, the received color image may be down sampled and cropped. For example, if the resolution of the color image is high definition (HD), the color image may be down sampled to a lower resolution, such as a VGA-equivalent size (e.g., 640×480 resolution). In some embodiments, the boundaries of the received color image may not comprise depth information. As such, the boundaries of the color image may be cropped out or removed so that further processing on the color image may be more efficient.

At block 830 of FIG. 8, a foreground region filling may be performed. For example, in some instances, the depth image as received in FIG. 8 may comprise a reduced resolution than that of the color image. In such an instance, a warped foreground region may comprise a sparse set of pixels while unknown pixels within the sparse set of pixels should be labeled as foreground pixels. As such, for each unknown pixel, a local window surrounding the pixel may be searched for other foreground pixels. If the unknown pixel is surrounded by foreground pixels, then it may be assumed that the unknown pixel lies within the sparse set of foreground pixels and should thus be re-categorized or labeled as a foreground pixel.

At block 840, unclear regions of the color image may be identified and segmented out of the foreground and background regions of the color image so that further processing may be performed on the unclear region. The unclear region may comprise the area or set of pixels of which may not yet be categorized as a background pixel or a foreground pixel. As previously discussed, foreground region filling may be performed on unknown pixels that are surrounded by foreground pixels. However, if an unknown pixel is not surrounded by foreground pixels, then it may be comprised within an unclear region. For example, an unclear region may comprise pixels at the position of a user's hair. An unclear region surrounding a user's body may be further identified by expanding the contour line of the user body outwards and/or inwards to become a region. As such, unclear regions may be identified.

At block 850, a color background history may be applied and updated. The color background history may comprise the accumulated color values of a plurality of color images. In some embodiments, the color background history may be used to remove unclear head pixels from the unclear region that comprise color values that are similar with the corresponding color values in the color background history. In some embodiments, the application of the color background history may be performed before the processes described with relation to block 840 so as to create a more efficient color image process. The color background history may, also be used when applying a graph cut as described in further detail below.

At block 860, a graph may be constructed. For example, a graph may be constructed by all of the pixels in the identified unclear region, along with any foreground and background pixels that is adjacent to the unclear region. Each pixel is then connected to its 4 or 8 neighboring pixels and a source that represents the foreground and a sink that represents the background. In some embodiments, N-links may be inter-pixel links. Terminal links (T-links) may comprise links connecting a pixel to the source or the sink. The capacities of the N-links may be assigned based on the color contrast (L1 norm) between pixels based on the following equation:

$$cap_N(i,j) = \begin{cases} \lambda_N e^{-\beta_N \|p_i - p_j\|_2} & \text{if } \|p_i - p_j\|_1 < \delta_N \\ 0 & \text{else.} \end{cases}$$

The capacities of the T-links may comprise the summation of several factors. One such factor may comprise the probability with respect to the Gaussian mixture models of the background and the Gaussian mixture model of the foreground. These models may be learned and updated using the detected background pixels from the previous color image frames. Another factor may comprise the temporal coherence of the region map of the current image frame and the region map of the previous image frame. For each pixel i in the graph, a value cap(i) (capacity) may be defined as the following equation:

$$cap(i) = \begin{cases} \lambda_T e^{-\beta_T \|p_i^{current} - p_i^{previous}\|_2} & \text{if } \|p_i^{current} - p_i^{previous}\|_1 < \delta_T \\ 0 & \text{else} \end{cases}$$

If the pixel i is categorized as a foreground pixel in the previous image frame's region map, then $cap_{source}(i) = cap(i)$ and $cap_{sink}(i) = 0$. However, if the pixel i is categorized as a background pixel in the previous image frame's region map, then set $cap_{source}(i) = 0$ and $cap_{sink}(i) = cap(i)$.

A third factor may comprise the color contrast (L1 norm) between a pixel in the graph and its color background history, as in the following equation:

$$cap_{source}(i) = 0;$$
$$cap_{sink}(i) = \begin{cases} \lambda_T e^{-\beta_T \|p_i^{current} - p_i^{previous}\|_2} & \text{if } \|p_i^{current} - p_i^{previous}\|_1 < \delta_T \\ 0 & \text{else.} \end{cases}$$

In some embodiments, the $cap_{source}$ of the foreground pixels in the graph may be set to a large enough constant number to prevent its categorization as a background pixel by the graph cut algorithm. Similarly, the $cap_{sink}$ of the background pixel must also be set to a large constant number. As such, a fast binary graph cut may be performed on the graph based on a number of factors to obtain a segmentation between the foreground and background.

At block 870, the region map may be stabilized in order to reduce small temporal flickering of the foreground-background edges (e.g., edge waviness artifacts). Noisy pixels may be detected in the unclear region of the region map before the graph cut is performed by counting the foreground to background and background to foreground transition time of each pixel. For every new frame and for each pixel of the new frame, if the pixel doesn't transition from one categorized region to another categorized region (e.g., from a foreground region to a background region), its transition count may decrease. However, if the pixel does transition from a categorized region to another categorized region (e.g., from a background region to a foreground region), then the pixel transition count may increase. If a pixel's transition count is above a threshold value, the region categorization of the pixel may be copied from the pixel's region categorization from the previous image frame's region map.

In some embodiments, at block 880, a median filter may be applied to the identified foreground region in order to smoothen the foreground edges. The median filter may be applied in the following pseudo code manner:

```
For each pixel p in UC region
{
Count = 0;
    For each pixel p_j in the NxN support window around pixel p {
        If R(p_j) = UC, count++;
    }
    If (count<N*N/2), R(p) = BG;
    Else R(p) = FG;
}
```

At block 890, an alpha mask may be generated to convert the foreground categorized pixels to a 0xFF alpha value and convert other categorized pixels to a 0x00 alpha value. In some embodiments, this may comprise an up sampling for the alpha mask.

Figure 9A:
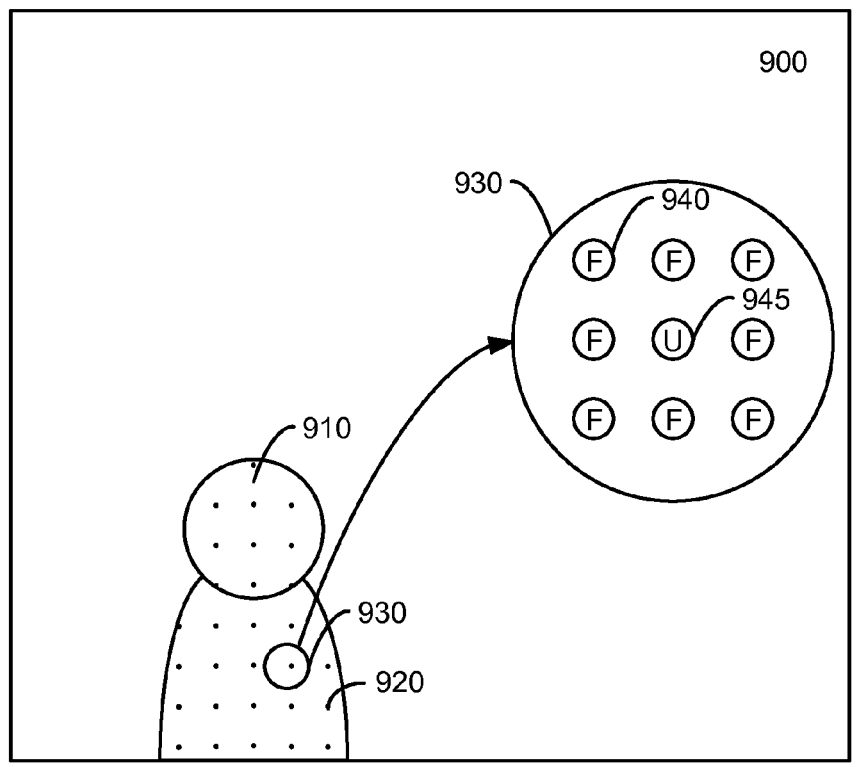
FIG. 9A illustrates an example of foreground region filling in accordance with some embodiments.
Figure 9B:
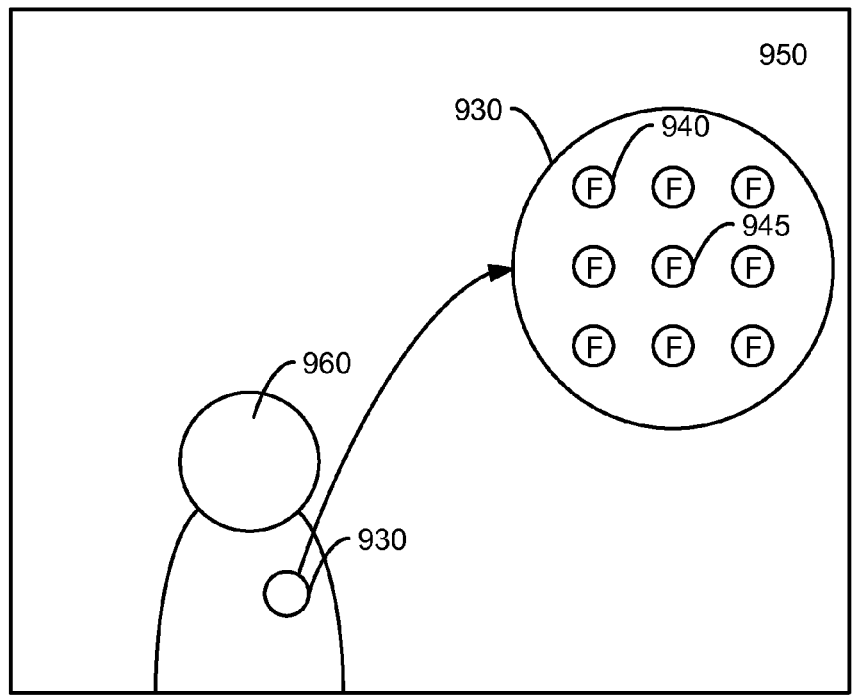
FIG. 9B illustrates an example of a completed foreground region filling in accordance with some embodiments.

FIG. 9A illustrates an example embodiment of foreground region filling 900. In general, if a depth image resolution is lesser or smaller than a corresponding color image resolution, then pixels categorized as unknown pixels may be re-categorized as either a foreground pixel or a background pixel. As seen in FIG. 9A, a foreground region 910 may comprise unknown pixels 920. Unknown pixel window 930 comprises a plurality of foreground pixels 940 and at least one unknown pixel 945. In some embodiments, if an unknown pixel is surrounded by foreground pixels or all of its neighboring pixels comprise foreground pixels, then the unknown pixel 945 may be categorized as an unknown pixel. For example, FIG. 9B illustrates an example embodiment 950 of a foreground region that has been processed with foreground region filling. As seen in FIG. 9B, filled foreground region 930 comprises the foreground pixels 940 and the previously unknown pixel 945 is re-categorized as a foreground pixel.

Figure 10:
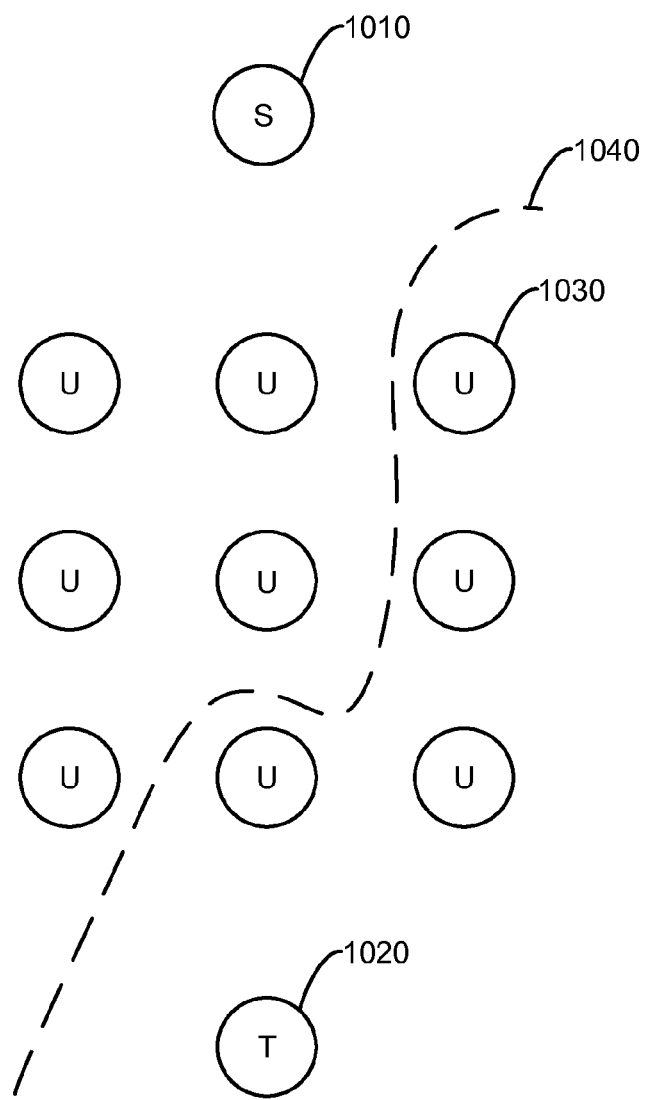
FIG. 10 is an example graph cut for segmenting pixels in an unclear band between the foreground and the background in accordance with some embodiments

FIG. 10 illustrates an example graph cut 1000 in accordance with some embodiments. In general, the graph cut 1000 may comprise separating or segmenting unclear pixels into at least two different subsets, one subset comprising unclear pixels grouped with a source and another subset comprising unclear pixels grouped with a sink. In some embodiments, the source may represent the foreground and the sink may represent the background. As such, the unclear region pixels may be segmented into two subsets, one subset including a representation of the foreground and the other subset including a representation of the background. As seen in FIG. 10, a graph cut 1000 may comprise a source 1010, sink 1020, and unclear pixels 1030. The cut 1040 segments the unclear pixels 1030. For example, the unclear pixels to the left of the graph cut 1040 are grouped or segmented with the source and the unclear pixels to the right of the graph cut 1040 are grouped or segmented with the sink. Since the source and the sink represent the foreground and the background, the graph cut 1040 segments the unclear pixels 1030 between the foreground and background. As such, the unclear band is processed to create a segmentation of the pixels within it.

Figure 11:
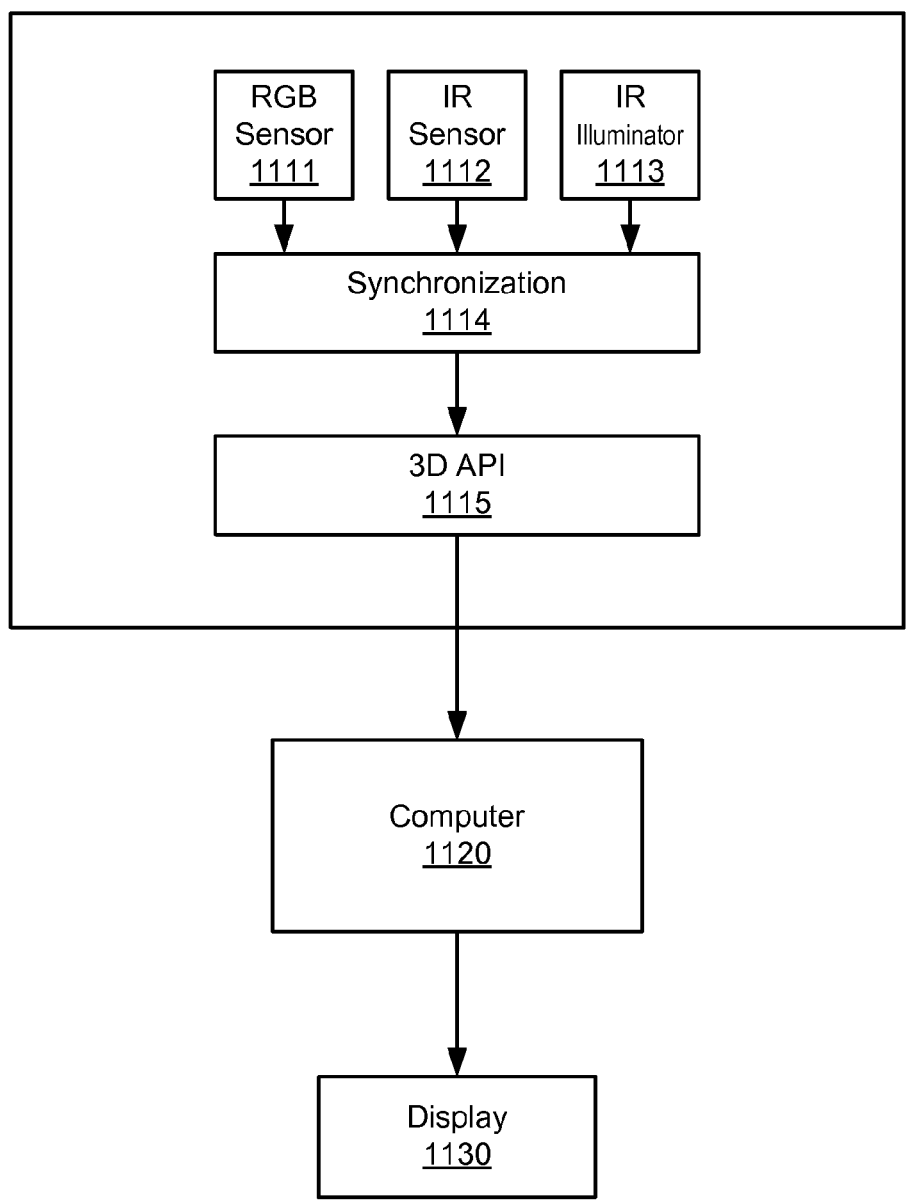
FIG. 11 illustrates an embodiment of a camera system for foreground video embedding in accordance with some embodiments.

FIG. 11 illustrates an embodiment of a camera system 1100 for the foreground video embedding systems and methods of the present invention. In general, the camera system 1100 comprises a camera 1110, computer 1120, and display 1130.

As seen in FIG. 11, a camera 1110 is connected to a computer 1120. The camera 1110 may comprise a three dimensional (3D) camera, depth camera, z-camera, range camera. In some embodiments, the camera 1110 may be comprised of a color or RGB camera and a depth camera or may comprise of a single camera with an RGB sensor and depth sensor. As such, the camera 1110 receives color information and depth information. The received color information may comprise information related to the color of each pixel of a video. In some embodiments, the color information is received from a Red-Green-Blue (RGB) sensor 1111. As such, the RGB sensor 1111 may capture the color pixel information in a scene of a captured video image. The camera 1110 may further comprise an infrared sensor 1112 and an infrared illuminator 1113. In some embodiments, the infrared illuminator 1113 may shine an infrared light through a lens of the camera 1110 onto a scene. As the scene is illuminated by the infrared light, the infrared light will bounce or reflect back to the camera 1110. The reflected infrared light is received by the infrared sensor 1112. The reflected light received by the infrared sensor results in depth information of the scene of the camera 1110. As such, objects within the scene or view of the camera 1110 may be illuminated by infrared light from the infrared illuminator 1113. The infrared light will reflect off of objects within the scene or view of the camera 1110 and the reflected infrared light will be directed towards the camera 1110. The infrared sensor 1112 may receive the reflected infrared light and determine a depth or distance of the objects within the scene or view of the camera 1110 based on the reflected infrared light.

In some embodiments, the camera 1110 may further comprise a synchronization module 1114 to temporally synchronize the information from the RGB sensor 1111, infrared sensor 1112, and infrared illuminator 1113. The synchronization module 1114 may be hardware and/or software embedded into the camera 1110. In some embodiments, the camera 1110 may further comprise a 3D application programming interface (API) for providing an input-output (IO) structure and interface to communicate the color and depth information to a computer system 1120. The computer system 1120 may process the received color and depth information and comprise and perform the systems and methods disclosed herein. In some embodiments, the computer system 920 may display the foreground video embedded into the background feed onto a display screen 1130.

Figure 12:
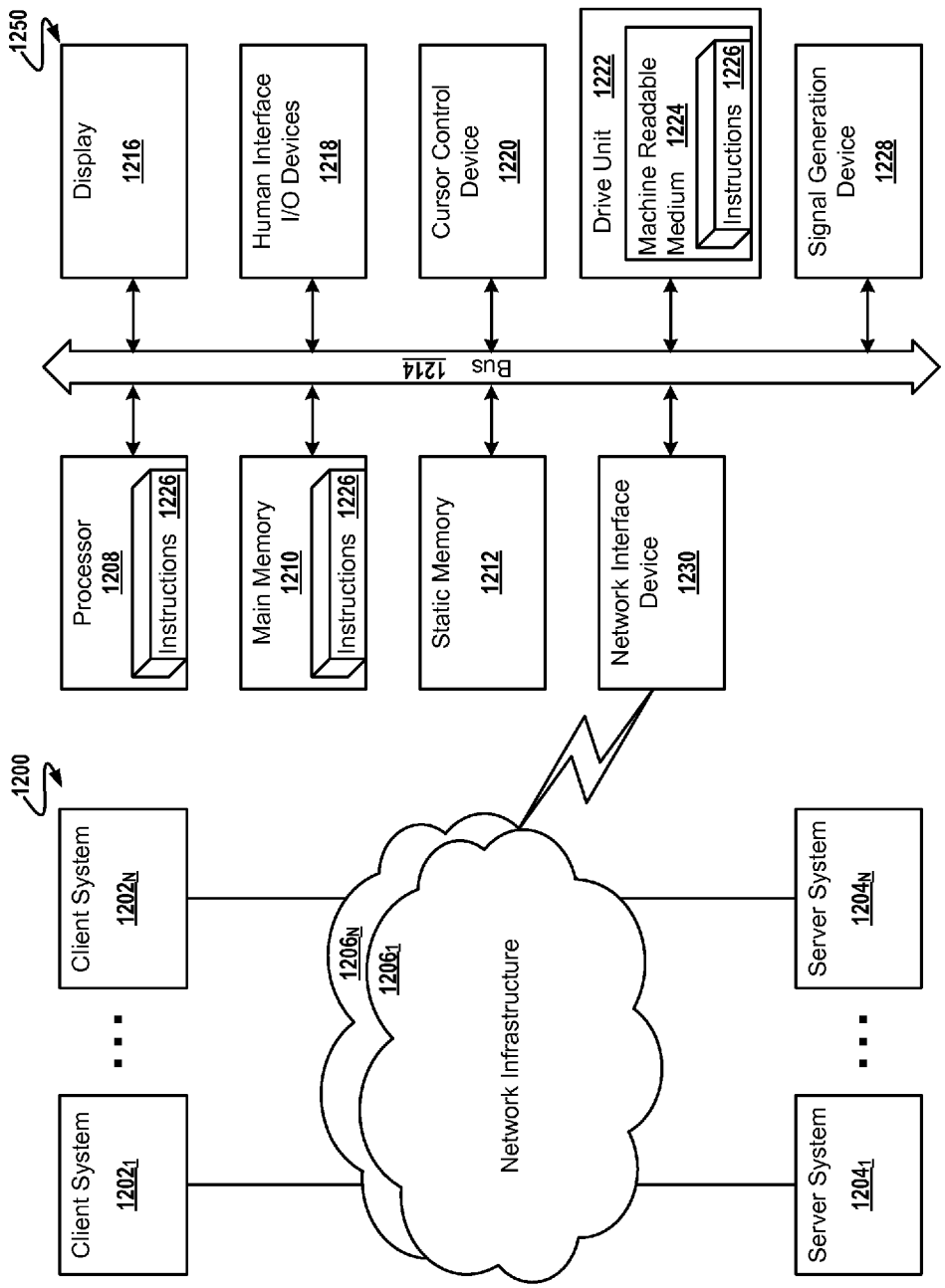
FIG. 12 illustrates an embodiment of a computer system and network system that incorporates the foreground video embedding systems and methods of the present invention.

FIG. 12 is a diagrammatic representation of a network 1200, including nodes for client computer systems $1202_1$ through $1202_N$, nodes for server computer systems $1204_1$ through $1204_N$, nodes for network infrastructure $1206_1$ through $1206_N$, any of which nodes may comprise a machine 1250 within which a set of instructions for causing the machine to perform any one of the techniques discussed above may be executed. The embodiment shown is purely exemplary, and might be implemented in the context of one or more of the figures herein.

Any node of the network 1200 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1250 includes a processor 1208 (e.g. a processor core, a microprocessor, a computing device, etc), a main memory 1210 and a static memory 1212, which communicate with each other via a bus 1214. The machine 1250 may further include a display unit 1216 that may comprise a touch-screen, or a liquid crystal display (LCD), or a light emitting diode (LED) display, or a cathode ray tube (CRT). As shown, the computer system 1250 also includes a human input/output (I/O) device 1218 (e.g. a keyboard, an alphanumeric keypad, etc), a pointing device 1220 (e.g. a mouse, a touch screen, etc), a drive unit 1222 (e.g. a disk drive unit, a CD/DVD drive, a tangible computer readable removable media drive, an SSD storage device, etc), a signal generation device 1228 (e.g. a speaker, an audio output, etc), and a network interface device 1230 (e.g. an Ethernet interface, a wired network interface, a wireless network interface, a propagated signal interface, etc).

The drive unit 1222 includes a machine-readable medium 1224 on which is stored a set of instructions (i.e. software, firmware, middleware, etc) 1226 embodying any one, or all, of the methodologies described above. The set of instructions 1226 is also shown to reside, completely or at least partially, within the main memory 1210 and/or within the processor 1208. The set of instructions 1226 may further be transmitted or received via the network interface device 1230 over the network bus 1214.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Although the present invention has been described in terms of specific exemplary embodiments, it will be appreciated that various modifications and alterations might be made by those skilled in the art without departing from the spirit and scope of the invention. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method for processing a video, the method comprising:
    receiving, using a computer, a depth image and a color image of the video from at least one camera;
    identifying a categorization for each pixel of the depth image of the video based on a comparison of a depth value for each pixel and at least one pixel history, the categorization comprises at least one of a user pixel, background pixel, and unknown pixel;
    creating a region map based on the categorization for each of the pixels;
    identifying an unclear region of the color image based on the region map;
    creating an unclear region band of the color image, the unclear region band comprises categorized unclear pixels of the color image; and
    distributing the categorized unclear pixels of the unclear region band of the color image into a foreground region and a background region.

2. The method as set forth in claim 1, further comprising grouping each of the pixels of the depth image of the video, the grouping comprising comparing the categorization and depth value of each of the pixels with a categorization and depth value of at least one neighboring pixel, if the pixel and the neighboring pixel comprise the same categorization and a similar depth value, then the pixel and the neighboring pixel are grouped into a connected component.

3. The method as set forth in claim 2, further comprising detecting if a connected component is in motion between the depth image frame and a next depth image frame, the motion is detected by comparing a difference in the depth value of at least one pixel of the connected component in the depth image frame and a depth value of at least one pixel of the connected component in the next depth image frame, a connected component comprising user pixels is determined to be a user, a connected component comprising background pixels in motion is determined to be a user if a head of the user is detected, a connected component comprising unknown pixels is determined to be a user if a head of the user is detected.

4. The method as set forth in claim 3, wherein the region map comprises categorizing user pixels in the connected component as foreground pixels if a user associated with the connected component is enabled, the user pixels are categorized as background pixels if the user associated with the connected component is disabled.

5. The method as set forth in claim 3, further comprising detecting features and gestures of the user for a connected component comprising user pixels, the detection of features comprises locating the user's head and hands, the detection of gestures comprises detecting a movement of the user's hands.

6. The method as set forth in claim 1, further comprising a foreground region filling if a resolution of the depth image is less than a resolution of the color image, the foreground region filling comprising categorizing at least one unknown pixel as a foreground pixel if the unknown pixel is surrounded by foreground pixels.

7. The method as set forth in claim 1, wherein the unclear region band is created by expanding, on a user body, a contour line separating the foreground region and the background region on the user body outwards and inwards and expanding the unclear region band surrounding a head of the user.

8. The method as set forth in claim 1, wherein the distributing of the categorized unclear pixels of the unclear region band comprises performing a graph cut on unclear pixels in the unclear region and adjacent foreground and background pixels, the graph cut segments the unclear pixels into at least two subsets comprising a foreground region comprising foreground pixels and a background region comprising background pixels.

9. A system, comprising at least one processor and memory, for processing a video, the system comprising:
- a module for receiving a depth image and a color image of the video from at least one camera;
- a module for identifying a categorization for each pixel of the depth image of the video based on a comparison of a depth value for each pixel and at least one pixel history, the categorization comprises at least one of a user pixel, background pixel, and unknown pixel;
- a module for creating a region map based on the categorization for each of the pixels;
- a module for identifying an unclear region of the color image based on the region map;
- a module for creating an unclear region band of the color image, the unclear region band comprises categorized unclear pixels of the color image; and
- a module for distributing the categorized unclear pixels of the unclear region band of the color image into a foreground region and a background region.

10. The system as set forth in claim 9, further comprising grouping each of the pixels of the depth image of the video, the grouping comprising comparing the categorization and depth value of each of the pixels with a categorization and depth value of at least one neighboring pixel, if the pixel and the neighboring pixel comprise the same categorization and a similar depth value, then the pixel and the neighboring pixel are grouped into a connected component.

11. The system as set forth in claim 10, further comprising detecting if a connected component is in motion between the depth image frame and a next depth image frame, the motion is detected by comparing a difference in the depth value of at least one pixel of the connected component in the depth image frame and a depth value of at least one pixel of the connected component in the next depth image frame, a connected component comprising user pixels is determined to be a user, a connected component comprising background pixels in motion is determined to be a user if a head of the user is detected, a connected component comprising unknown pixels is determined to be a user if a head of the user is detected.

12. The system as set forth in claim 11, wherein the region map comprises categorizing user pixels in the connected component as foreground pixels if a user associated with the connected component in motion is enabled, the foreground pixels are categorized as background pixels if the user associated with the connected component is disabled.

13. The system as set forth in claim 11, further comprising detecting features and gestures of the user for a connected component comprising user pixels, the detection of features comprises locating the user's head and hands, the detection of gestures comprises detecting a movement of the user's hands.

14. The system as set forth in claim 9, further comprising a foreground region filling if a resolution of the depth image is less than a resolution of the color image, the foreground region filling comprising categorizing at least one unknown pixel as a foreground pixel if the unknown pixel is surrounded by foreground pixels.

15. The system as set forth in claim 9, wherein the unclear region band is created by expanding, on a user body, a contour line separating the foreground region and the background region on the user body outwards and inwards and expanding the unclear region band surrounding a head of the user.

16. The system as set forth in claim 9, wherein the distributing of the categorized unclear pixels of the unclear region band comprises performing a graph cut on unclear pixels in the unclear region and adjacent foreground and background pixels, the graph cut segments the unclear pixels into at least two subsets comprising a foreground region comprising foreground pixels and a background region comprising background pixels.

17. A non-transitory computer readable medium carrying one or more instructions for processing a video, wherein the one or more instructions, when executed by one or more processors, causes the one or more processors to perform the steps of:
- receiving a depth image and a color image of the video from at least one camera;
- identifying a categorization for each pixel of the depth image of the video based on a comparison of a depth value for each pixel and at least one pixel history, the categorization comprises at least one of a user pixel, background pixel, and unknown pixel;
- creating a region map based on the categorization for each of the pixels;
- identifying an unclear region of the color image based on the region map;
- creating an unclear region band of the color image, the unclear region band comprises categorized unclear pixels of the color image; and
- distributing the categorized unclear pixels of the unclear region band of the color image into a foreground region and a background region.

18. The non-transitory computer readable medium as set forth in claim 17, further comprising grouping each of the pixels of the depth image of the video, the grouping comprising comparing the categorization and depth value of each of the pixels with a categorization and depth value of at least one neighboring pixel, if the pixel and the neighboring pixel comprise the same categorization and a similar depth value, then the pixel and the neighboring pixel are grouped into a connected component.

19. The non-transitory computer readable medium as set forth in claim 18, further comprising detecting if a connected component is in motion between the depth image frame and a next depth image frame, the motion is detected by comparing a difference in the depth value of at least one pixel of the connected component in the depth image frame and a depth value of at least one pixel of the connected component in the next depth image frame, a connected component comprising user pixels is determined to be a user, a connected component comprising background pixels in motion is determined to be a user if a head of the user is detected, a connected component comprising unknown pixels is determined to be a user if a head of the user is detected.

20. The non-transitory computer readable medium as set forth in claim 19, wherein the region map comprises categorizing user pixels in the connected component in motion as foreground pixels if a user associated with the connected component in motion is enabled, the user pixels are categorized as background pixels if the user associated with the connected component is disabled.

21. The non-transitory computer readable medium as set forth in claim 17, further comprising a foreground region filling if a resolution of the depth image is less than a resolution of the color image, the foreground region filling comprising categorizing at least one unknown pixel as a foreground pixel if the unknown pixel is surrounded by foreground pixels.

22. The non-transitory computer readable medium as set forth in claim 17, wherein the unclear region band is created by expanding, on a user body, a contour line separating the foreground region and the background region on the user body outwards and inwards and expanding the unclear region band surrounding a head of the user.

23. The non-transitory computer readable medium as set forth in claim 17, wherein the distributing of the categorized unclear pixels of the unclear region band comprises performing a graph cut on unclear pixels in the unclear region and adjacent foreground and background pixels, the graph cut segments the unclear pixels into at least two subsets comprising a foreground region comprising foreground pixels and a background region comprising background pixels.

* * * * *